United States Patent [19]

Kushida et al.

[11] Patent Number: 4,725,396

[45] Date of Patent: Feb. 16, 1988

[54] ELECTROMAGNETIC ACTUATORS AND METHOD FOR PRODUCING THE SAME

[75] Inventors: Takeo Kushida, Higashi-Matsuyama; Taniai Youichi, Tokyo, both of Japan

[73] Assignees: Diesel Kiki Co., Ltd.; Sanken Airpax Co., Ltd., both of Tokyo, Japan

[21] Appl. No.: 937,005

[22] Filed: Feb. 11, 1987

Related U.S. Application Data

[62] Division of Ser. No. 831,444, Feb. 20, 1986, Pat. No. 4,677,327.

[30] Foreign Application Priority Data

Feb. 27, 1985 [JP] Japan .................................. 60-38412

[51] Int. Cl.[4] ......................... B29C 45/00; H02K 1/18

[52] U.S. Cl. ................................ 264/272.15; 264/277

[58] Field of Search ...................... 264/272.15, 272.19, 264/137, 24, 23, 22, 277, DIG. 58, 272.14, 272.2; 251/129.16; 35/15, 28, 29, 32, 35, 12, 14, 42, 43, 87; 335/281, 282, 255; 336/96, 205, 232

[56] References Cited

U.S. PATENT DOCUMENTS

| | | | |
|---|---|---|---|
| 4,357,292 | 11/1982 | Myers | 264/137 |
| 4,419,177 | 12/1983 | Pryor et al. | 264/22 |
| 4,470,786 | 9/1984 | Sano et al. | 264/272.15 |
| 4,611,392 | 9/1986 | Bell | 264/23 |
| 4,628,809 | 12/1986 | Das et al. | 264/DIG. 58 |
| 4,656,733 | 4/1987 | Maenishi | 264/272.15 |
| 4,678,616 | 7/1987 | Kawashima | 264/24 |

*Primary Examiner*—Frank Sever

*Attorney, Agent, or Firm*—Wenderoth, Lind & Ponack

[57] ABSTRACT

A method for producing an electromagnetic actuator which includes a pair of member which are opposite to each other on the flat faces thereof for relative movement, a plurality of grooves formed concentrically in the flat face of one of said members opposite to the other for receiving a plurality of endless coils, and a plurality of endless coils received in said plurality of grooves, and further includes a communication hole formed in one of said pair of member to make communication between said grooves and having an inlet port for resin pouring, and resin integrally poured in between said plurality of coils and said plurality of grooves and in said communication hole, wherein; (a) a method having a projection is placed on the upper portion of said coil-receiving grooves, when resin is poured form said inlet port, and (b) the projection of said mold is engaged with said plurality of coils to keep them in place.

3 Claims, 3 Drawing Figures

ELECTROMAGNETIC ACTUATORS AND METHOD FOR PRODUCING THE SAME

This is a division of Ser. No. 831,444 filed 2-20-86, now U.S. Pat. No. 4,677,327.

FIELD OF THE INVENTION

The present invention relates generally to an electromagnetic force-operable electromagnetic actuator and, more particularly, to an electromagnetic actuator of the type which is used as the electromagnetic valve for controlling the opening or closing of, e.g., a fuel jetting valve.

BACKGROUND OF THE INVENTION

For instance, Japanese patent Laid-open publication No. 53 (1987)-120017 discloses such a type of electromagnetic actuator in which an armature and a stator, each in the flat plate form, are arranged in the face-to face relation. A plurality of endless coils are disposed on the face of the stator facing the armature, and currents are passed through the adjacent coils in the opposite direction, thereby to form an efficient magnetic circuit which is operable at a high speed. In aforesaid plurality of coils are fixedly received in grooves formed in the stator.

With reference to such an electromagnetic actuator, however, when resin is poured in the coil-containing grooves for fixation of the coils therein, as is conventionally done, there is a problem that since such grooves are independently provided, separate pouring of the resin therein is troublesome and time-consuming.

SUMMARY OF THE INVENTION

An object of the present invention is to provide an electromagnetic actuator which dispenses with such troublesome and time-consuming work as mentioned above, and allows easy assembling of coils.

Another object of the present invention is to provide an electromagnetic actuator which assures fixation of coils and thereby prevents incidental removal thereof.

A further object of the present invention is to provided a method for producing an electromagnetic actuator which permits easy assembling of coils.

According to a first aspect to the present invention, there is provided an electromagnetic actuator including a pair of member which are opposite to each other on the flat faces thereof for relative movement, a plurality of grooves formed concentrically in the flat face of one of said members opposite to the other for receiving a plurality of endless coils, and a plurality of endless coils received in said plurality of grooves, which further includes a communication hole formed in one of said pair of members to make communication between said grooves and having an inlet port for resin pouring, and resin integrally poured in between said plurality of coils and said plurality of grooves and in said communication hole.

According to second aspect of the present invention, there is provided A method for producing an electromagnetic actuator which includes a pair of member which are opposite to each other on the flat faces thereof for relative movement, a plurality of grooves formed concentrically in the flat face of one of said members opposite to the other for receiving a plurality of endless coils, and a plurality of endless coils received in said plurality of grooves, and further includes a communication hole formed in one of said pair of member to make communication between said grooves and having an inlet port for resin pouring, and resin integrally poured in between said plurality of coils and said plurality of grooves and in said communication hole, wherein;

(a) a method having a projection is placed on the upper portion of said coil-receiving grooves, when resin is poured from said inlet port, and (b) the projection of said mold is engaged with said plurality of coils to keep them in place.

It is appreciated that additional features and advantages of the present invention may easily be achieved by those skilled in the art in the light of the following detailed description.

It is also appreciated that the accompanying drawings showing the embodiments including the principle of the present invention are given for the purpose of illustration alone.

DETAILED DESCRIPTION

Figure 1:
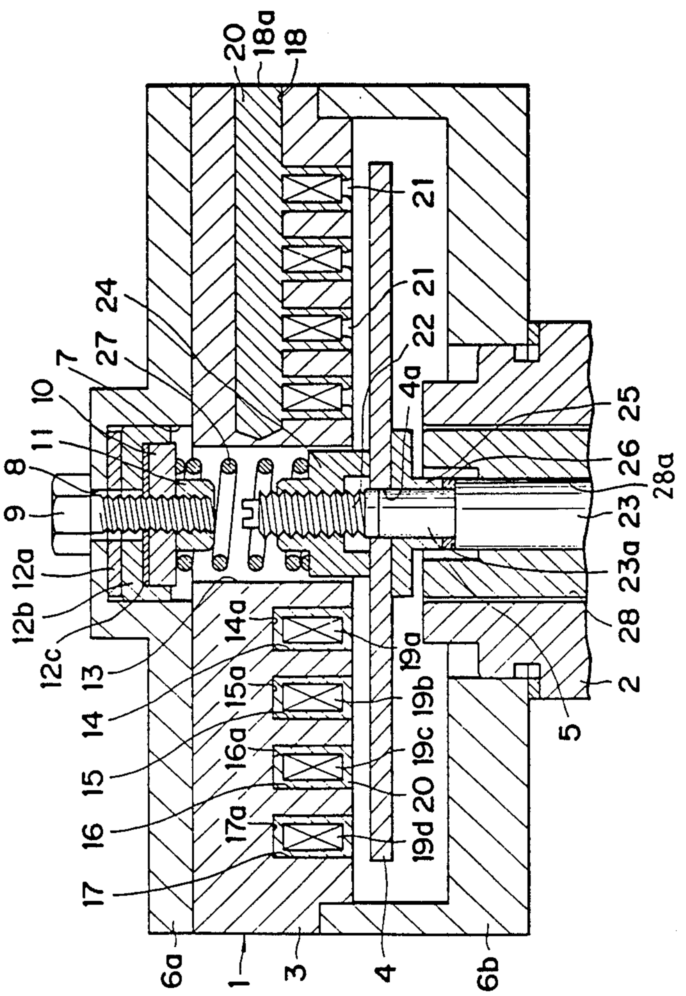
FIG. 1 is a sectional view showing the electromagnetic actuator according to the present invention.

Referring now to FIG. 1, electromagnetic actuator 1 forms an electromagnetic valve mounted to a fuel jetting device 2.

The actuator 1 includes a stator 3 formed of a magnetic material and an armature 4 again formed of a magnetic material, and is positioned with the stator 4 being opposite to the armature 4 on their flat faces. The armature 4 is fixedly provided with an output shaft 5.

The stator 3 is secured to upper and lower housings *6a* and *6b* by coupling the housing *6a* onto the upper face thereof and the end face of the housing *6b* to a coupling step *3a* formed on the peripheral edge of the lower face thereof.

In the central portion of the upper housing *6a*, there is formed a recession 7 including a threaded insertion hole 8 through which a bolt 9 is inserted. An upper spring bearing 10 is screwed onto the bolt 9 with the recession 7 by means of a nut 11, and spacers *12a–12c* are interposed between the upper spring bearing 10 and the bottom of the recession 7.

The stator 3 includes therein a center hole 13, around which, for instance, four(4) coil-receiving grooves 14–17 are concentrically formed in the lower surface of the stator 3. The stator 3 also includes therein a communication hole 18 for making communication between the grooves 14–17 at the bottoms *14a–17a*, said communication hole being open on the outer peripheral surface of the stator 3, and including an inlet portion *18a* for resin pouring.

Figure 2:
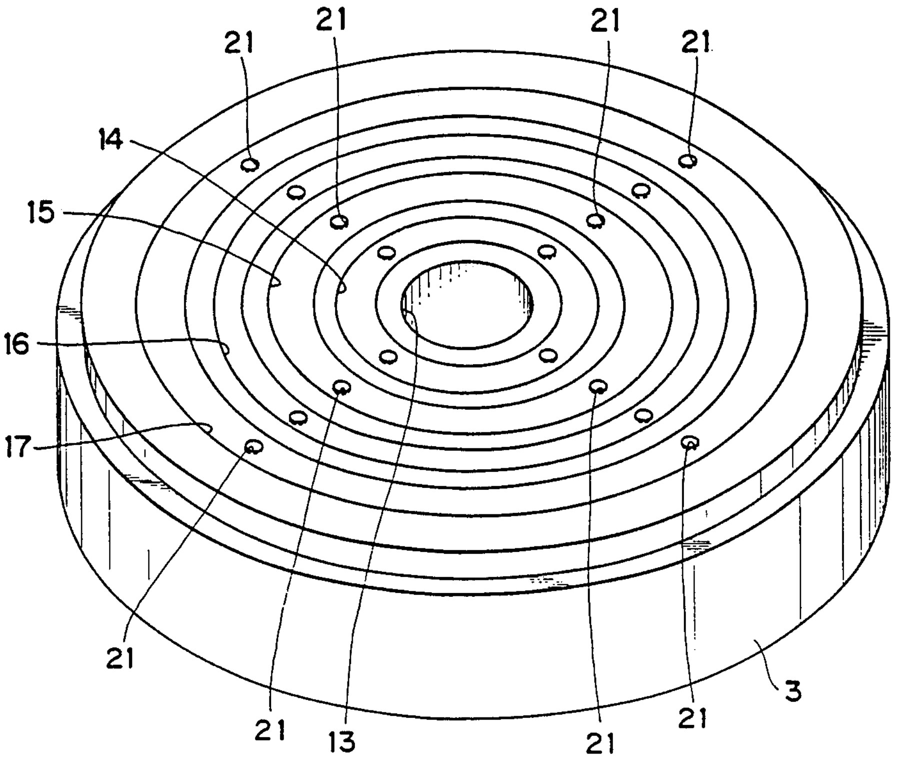
FIG. 2 is a perspective view illustrating the stator used with that actuator.

The grooves 14–17 each receive air-core coils *19a–19d*. A resin 20 is integrally poured in between the coils *19a–19d* and the grooves 14–17 and in the communication hole 18. A part of the resin 20 filled in between the open faces of the coil-receiving grooves 14–17 and the coils *19a–19d* is formed with an indention 21 resulting from pouring of resin, as will be described later(see FIG. 2).

It is understood that the coils *19a–19d* are connected in series with one another, and are arranged such that the winding directions of the adjacent coils are reversed to reverse the directions of flow of current passing therethrough.

The armature 4 includes therein a center through-hole 4*a*, into which the output shaft 5 is inserted. The output shaft 5 is formed with an externally threaded portion 22 at one end and a valve head portion(not shown) at the other end which is not illustrated. Between the valve head portion and the externally threaded portion 22, a portion 23 of an increased diameter is slidably moved in a sliding hole 28*a* in a valve seat member 28 for vertical guiding.

The externally threaded portion 22 faces the center hole 13 in the stator 3, and is in threaded engagement with a keep member 24. The armature 4 is then tightly clamped between that keep member 24 and a receptacle member 25.

The receptacle member 25 fitted over the output shaft 5 is locked onto one end face 23*a* of the increased-diameter portion 23. Between the upper spring bearing 10 and the keep member 24, there is resiliently interposed in the center hole 13 in the stator 3 to urge the armature 4 and the output shaft 5 downwardly.

The fuel jetting device 2 is placed on the lower portion of the lower housing 6*b*, and is provided with the valve seat member 28, through the sliding hole 28 in which, as already mentioned, there is slidably inserted the increased-diameter portion 23 of the shaft 5 in the axial direction. At the lower portion of the valve seat member 28 which is not shown, the valve head portion(not shown) formed at one end of the shaft 5 is moved for seating on, or away from, the valve seat member 28 by up or down movement of the shaft 5.

Figure 3:
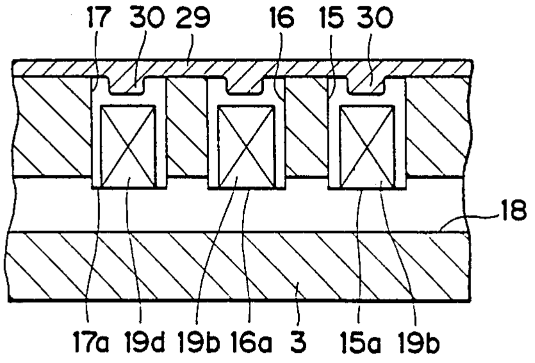
FIG. 3 is a partly sectioned view illustrative of the engagement of that stator with the mold.

In order to fix the coils 19*a*–19*d* in place by pouring of resin in the stator 3, the coils 19*a*–19*d* are initially positioned in the grooves 14–17 formed in the stator 3, and the open faces of the grooves 14–17 are then covered with a mold 29, as illustrated in FIG. 3.

The mold 29 is provided with a plurality of projections 30 at the positions corresponding to the grooves 14–17, said projections extending from the open faces of the grooves 14–17 into the grooves 14–17.

Subsequently, an amount of resin is poured from the inlet port 18*a* in the communication hole 18 to fill said resin in said hole 18 and in between the grooves 14–17 and the coils 19*a*–19*d*. At this time, the coils 19*a*–19*d* are forced up toward the open faces of the grooves 14–17 due to the pressure for pouring of resin. However, since they are retained by the projections 30, operation of resin-pouring is finished before their reaching the open faces. Finally, the mold 29 is removed (see FIG. 2). In the vicinity of the aforesaid open faces, the poured resin is formed with indentions 21 which register with the projections 30.

With the electromagnetic actuator 1 having stator 3 incorporated therein, excitation of the coils 19*a*–19*d* causes magnetic fluxes to be produced around said coils 19*a*–19*d*, whereby the armature 4 is attracted to the stator 3, so that the output shaft 5 is moved upwardly against the action of the spring 27. Subsequent interruption of excitation of the coils 19*a*–19*d* causes the armature 4 and the output shaft 5 to be moved downwardly under the action of the spring 27.

It is noted while the above-mentioned particular embodiment has been described as using one communication hole 18, a plurality of such holes may be provided, and may be used as air ventilation holes during resin pouring. The communication hole or holes may be positioned either radially or diametrically.

The projections 31 formed on the mold 29 are exclusively limited to any given shape and side. Consequently, use may be used of any projection capable of preventing forcing-up of the coils 19*a*–19*d* to the open faces of the coil-containing grooves 14–17 due to the pressure for resin pouring.

Evidently many changes and modifications of the present invention may be possible in the light of the foregoing.

It is therefore appreciated that the present invention may be additionally carried out in the form that is different from what is claimed.

What is claimed is:

1. A method comprising producing an electromagnetic actuator which includes a pair of members which are opposite to each other on the flat faces thereof for relative movement, a plurality of grooves formed concentrically in the flat face of one of said members opposite to the other for receiving a plurality of endless coils, and a plurality of endless coils received in said plurality of grooves, and further includes a communication hole formed in one of said pair of member to make communication between said grooves and having an inlet port for resin pouring by integrally pouring resin in between said plurality of coils and said plurality of grooves and in said communication hole, further by, (a) placing a projection on the upper portion of said coil-receiving grooves, when resin is poured from said inlet port, and (b) engaging the projection of said mold with said plurality of coils to keep them in place.

2. The method as defined in claim 1, wherein said mold is a disk plate.

3. The method as defined in claim 1, wherein said projection is in the semi-spherical form.

* * * * *